United States Patent [19]

Gwon

[11] Patent Number: 4,729,500
[45] Date of Patent: Mar. 8, 1988

[54] CONSTRUCTION OF A TAPE GUIDE ROLLER FOR A VIDEOCASSETTE RECORDER

[75] Inventor: Seong T. Gwon, Seoul, Rep. of Korea

[73] Assignee: Gold Star Co., Ltd., Seoul, Rep. of Korea

[21] Appl. No.: 878,646

[22] Filed: Jun. 26, 1986

[30] Foreign Application Priority Data

Jun. 26, 1985 [KR] Rep. of Korea .............. 7726/1985

[51] Int. Cl.$^4$ .......................................... B65H 20/00
[52] U.S. Cl. ................................... 226/190; 242/76
[58] Field of Search .................. 226/168, 190, 194; 242/75.2, 76

[56] References Cited

U.S. PATENT DOCUMENTS 2,109,451 3/1938 Loomis et al. .............. 242/76 X
3,402,868 9/1968 Hammond .................. 226/190 X
3,907,234 9/1975 Sato et al. .................. 226/194 X Primary Examiner—Daniel P. Stodola
Attorney, Agent, or Firm—Birch, Stewart, Kolasch & Birch

[57] ABSTRACT

A tape guide roller formed from a resin for a videocassette recorder comprises a roller body, a pair of flanges disposed at ends of the roller body, the pair of flanges being adapted to hold the roller body at a predetermined position on a shaft which is mounted to a body of the video cassette recorder, and an inertia ring made of a material generating a high inertia force, the inertia ring being secured to one end of the roller body whereby a tape utilized the tape guide roller can stably travel causing reduction of vibration of the tape guide roller.

1 Claim, 3 Drawing Figures

CONSTRUCTION OF A TAPE GUIDE ROLLER FOR A VIDEOCASSETTE RECORDER

BACKGROUND OF THE INVENTION

The present invention relates to a construction of a tape guide roller for guiding the tape travel in a videocassette recorder, and particularly, to a construction of a tape guide roller made of a resin material and provided at the upper or lower end thereof with an inertia ring made of a material providing a high rotational inertia force, so as to increase an efficiency of the attenuation for vibration, thereby enabling the tape to stably travel.

In a travelling system in a conventional videocassette recorder, the tape which is drawn out from a supply reel passes a rotary drum provided with a video head via several posts, then passes a group of guides via several posts and a capstan for controlling a speed of the tape travel. Finally, the tape is taken up by a take-up reel.

During such tape travel, the tape contacts with a tension post for controlling the tension of tape and various rotating rollers. Due to such contact, the tape is subject to various disturbances which generate longitudinal and transversal vibrations of various frequencies. As a result, the tape travel may be unstable, so that a stable frame can not be expected in the reproducing of the tape.

In order to prevent such instability of the tape travel, there have been several attempts in the prior art. In conventional videocassette recorders (hereinafter, referred to as VCR), for example, it has been proposed to improve the precision of true circle, the concentricity, and the precision of rotation in rotating objects associated with the tape, to improve the accuracy of the control of tape-tension, to reduce the travel-load of the travelling system, or to absorb a vibration of high frequency by contacting the tape with an inertia ring generating a high inertia force.

SUMMARY OF THE INVENTION

Accordingly, an object of the present invention is to provide a construction of a tape guide roller generating a high inertia force, enabling it to serve both as a guide roller and an impedance roller adapted to function as a means for attenuating a longitudinal vibration with a high frequency, and enabling the manufacture thereof to be inexpensive.

The design of an accurate impedance roller for attenuating the longitudinal vibration has to take account of a mass distribution of the tape, a friction between the tape and the roller, a viscous resistance of the rotating shaft of the roller, and a compliance of the tape. In order to increase the impedance efficiency, the roller generally must generate a high rotational inertial moment and an angular velocity. However, if the diameter of the roller is increased for the above-mentioned purpose, the inertia force of the roller is increased, but the angular velocity of the roller is decreased due to the constant circumferential velocity of the roller.

As well-known, the rotational inertial moment of the guide roller is expressed as the product of a square of the equivalent radius by the equivalent mass, as indicated by the following equation.

$$I = mk^2 \qquad (1)$$

There is a following relationship among the angular velocity, the circumferential velocity, and the radius.

$$\omega = V/r \qquad (2)$$

where,
I: a rotational inertia moment
m: an equivalent mass
k: an equivalent radius
$\omega$: an angular velocity
V: a circumferential velocity
r: a radius In the equation (1), the equivalent radius can be expressed as $k = r/\sqrt{2}$.

In order to increase the impedance efficiency, it is necessary to increase both the rotational inertia movement I and the angular velocity $\omega$, as mentioned above. However, if the radius r of the guide roller is increased, the angular velocity $\omega$ is proportionally decreased, although the rotational inertial moment I is proportionally increased. On the other hand, if the radius r is decreased, the angular velocity $\omega$ is proportionally increased, but the rotational inertial moment I is proportionally decreased.

Although the impedance effect is increased if the equivalent mass m is increased, the excessively high equivalent mass causes the impedance effect to be rather decreased. However, it is effective to increase the equivalent mass m, that is, to increase the inertia force, but to decrease the diameter of the roller, in cases of the ordinary designs of the rollers. To this end, a material having a high specific gravity, such as a phosphor bronze is often used as the material of the roller. A conventional construction in such case is shown in FIG. 1. The construction comprises a rotary roller body 1 made of a material having a high specific gravity, such as a phosphor bronze, sleeve bearings 2 and 3 fit in the interior of said roller body 1, and retainers 4 and 5 mounted to both ends of said roller body 1. The construction also includes flanges 7 and 8 disposed at both ends of the roller body 1 and adapted to adjust the position of the roller on a shaft 6. However, this tape guide roller generally needs a very high concentricity in order to provide the stability of the frame. For example, in the case of M loading-type VHS mode, the surface vibration of the rotary rollers arranged at both inlet and outlet sides of the drum should be limited within 5 microns.

In the conventional rotary roller shown in FIG. 1, therefore, it is necessary to precisely manufacture the construction, in order to increase the concentricity between each inner surface of the sleeve bearings 2 and 3 and the outer surface of the roller body 1. However, this results in the increase of the cost of the manufacture.

Accordingly, the present invention is proposed to overcome the above-mentioned problems encountered in the prior art and provides a construction of a tape guide roller which is made of a resin material and includes an inertia ring adapted to generate a high inertia force and disposed at the upper or lower end of said guide roller.

In accordance with the present invention, both rotational inertial moment I and angular velocity $\omega$ are increased by the inertia ring so as to increase the impedance efficiency of the roller, thereby enabling the tape travel to be stable.

The present invention can be more fully understood from the following detailed description when taken in conjunction with the accompanying drawings.

BRIEF DESCRIPTION OF THE DRAWINGS

FIGS. 2 and 3 are sectional views of a tape guide rollers in accordance with the present invention, wherein FIG. 2 shows a roller restraining the upper edge of the tape and FIG. 3 shows a roller restraining the lower edge of the tape.

DETAILED DESCRIPTION OF THE PREFERRED EMBODIMENTS

Figure 1:
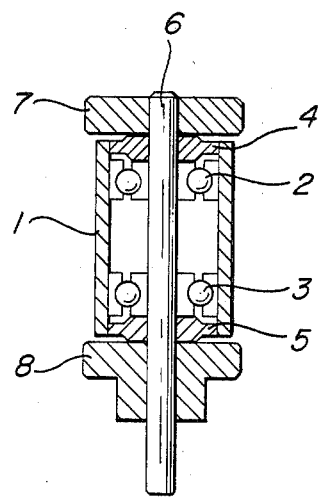
FIG. 1 is a sectional view of a conventional tape guide roller.
Figure 2:
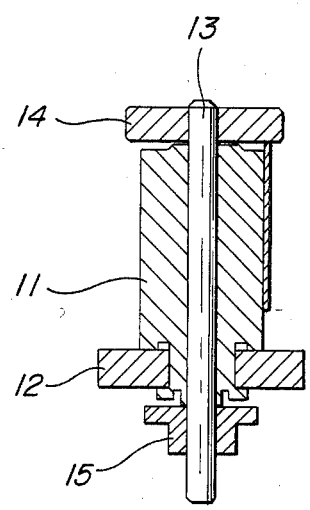

FIG. 2 is a sectional view showing a construction of a tape guide roller, wherein the roller 11 restrains the upper edge of the tape. The guide roller 11 is made of a resin material. To the lower end of the guide roller 11, an inertia ring 12 is firmly fit in a manner of well-known cocking. This roller assembly is fit to a shaft 13 and held at a desired position by means of flanges 14 and 15. The inertia ring 12 has a diameter larger than that of the guide roller 11.

In this construction, the roller 11 has a small diameter so that the outer surface thereof contacting with the tape is closer toward the axis of the shaft 13. Accordingly, the angular velocity of the roller 11 is fast. And also, the inertia ring 12 having a large diameter and a high specific gravity rotates at a fast velocity identical to that of the roller 11. Thus, a high efficiency of attenuating the vibration can be obtained, in virtue of both high angular velocity and inertial moment.

Figure 3:
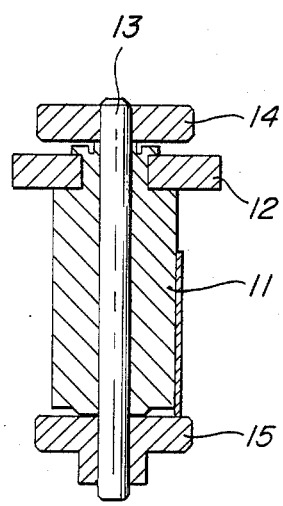

On the other hand, FIG. 3 shows a modified construction of a tape guide roller, wherein the roller 11 restrains the lower edge of the tape. In this case, the inertia ring 12 is fit to the upper end of the roller 11. This construction provides the same effect as that of the construction of FIG. 2.

As can be understood from the above-description, the present invention provides a construction of a tape guide roller generating a high inertia force, enabling it to serve both as a guide roller and an impedance roller and enabling the manufacture thereof to be inexpensive.

What is claimed is:

1. A tape guide roller for a video cassette recorder which comprises:

a resin roller body, a pair of flanges disposed at ends of said roller body, said pair of flanges being adapted to hold said roller body at a predetermined position on a shaft which is mounted to a body of said videocassette recorder, and an inertia ring made of a material generating a high inertia force, said inertia ring being secured to one end of said roller body whereby a tape utilized by the tape guide roller can stably travel causing reduction of vibration of the tape guide roller.

* * * * *